May 9, 1967  E. C. ATWELL  3,318,757
POLYVINYL CHLORIDE RESIN GLASS BOND WITH
SECONDARY AMINOALKYL SILANE PRIMER
Filed Dec. 6, 1961
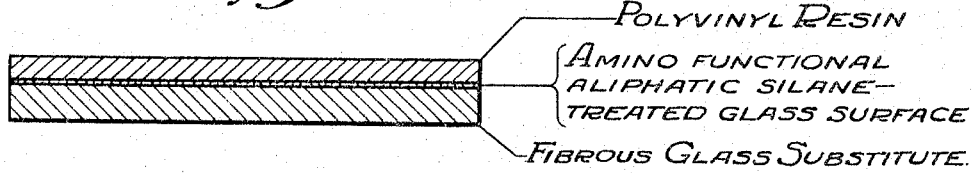
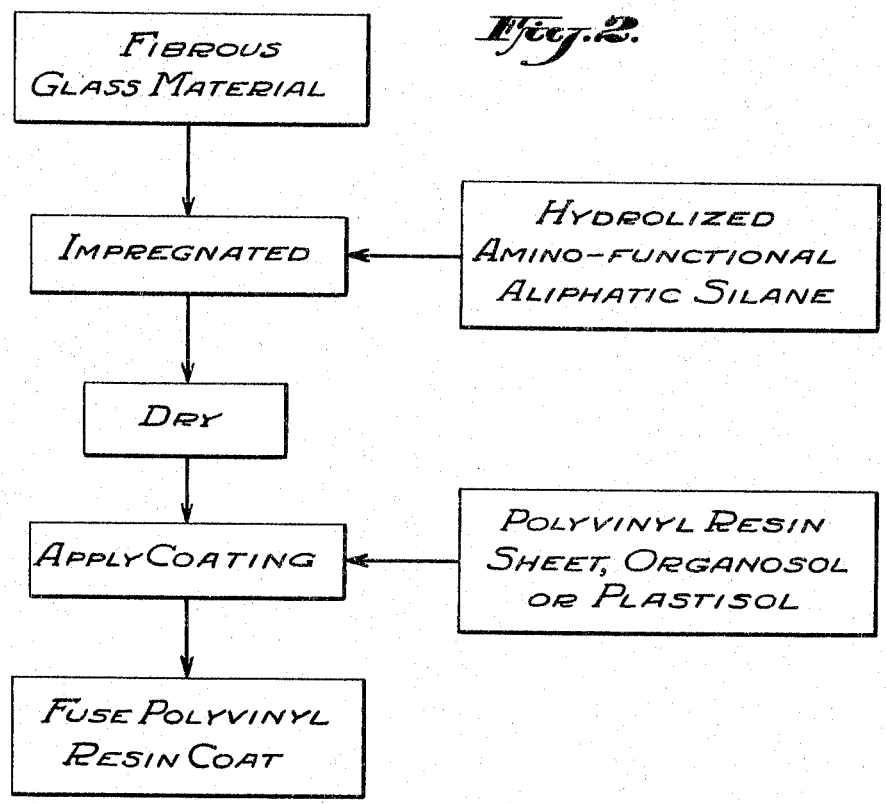
INVENTOR.
EVERETT C. ATWELL.
BY
Ward, Neal, Haselton, Orme & McElhannon
ATTORNEYS.

United States Patent Office 3,318,757
Patented May 9, 1967

3,318,757
POLYVINYL CHLORIDE RESIN GLASS BOND WITH SECONDARY AMINOALKYL SILANE PRIMER
Everett C. Atwell, Greensboro, N.C., assignor, by mesne assignments, to Burlington Industries, Greensboro, N.C., a corporation of Delaware
Filed Dec. 6, 1961, Ser. No. 157,400
9 Claims. (Cl. 161—193)

This invention relates to a process for effecting a very significant improvement in the adhesive bond between a glass surface substrate and a layer or film of polyvinyl resin, and also to a glass substrate polyvinyl resin product embodying the improved bond. More particularly, it relates to fibrous glass products, for example yarns, roving, tapes and glass fabrics bearing a firmly adhering layer or film of polyvinyl resin material, and to methods for adhering polyvinyl resins to such fibrous glass substrates.

The vinyl polymer resins referred to herein are the well-known thermoplastic materials comprising polyvinyl chloride or vinyl chloride-vinyl acetate copolymers, which are readily available in the form of unsupported, plasticized sheets, or dissolved in an organic solvent, i.e. an organosol, or in the form of liquid plastisols consisting of the polyvinyl resin, plasticizer, pigment and necessary or desirable stabilizers, as set forth more specifically hereinafter.

Plasticized vinyl resin films, like most other film-forming materials, exhibit exceedingly poor adhesion to glass surfaces, regardless of whether the surface takes the form of a continuous smooth sheet, a collection of filaments or a woven glass fabric. To date attempts to improve the weak bond between glass and the above vinyl polymers has not met with any appreciable success. The development of a satisfactory method for obtaining a high strength adhesive bond between vinyl polymer resins and a fibrous glass substrate, for example, will provide new uses for both glass fabrics and the polyvinyl resins. For example, a fibrous glass textile material with a strongly adhering polyvinyl resin coating constitutes a product which exhibits not only the chemical and abrasion resistance of the vinyl film, but also possesses the high strength and dimensional stability of a woven glass fabric. For example, in addition to very greatly enhancing the tensile and bursting strength of the vinyl polymer film, the product of the present invention when in the form of a flexible sheet exhibits substantially improved resistance to puncturing as compared with the unbonded vinyl film.

In the accompanying drawing FIG. 1 is an enlarged representation of the glass-vinyl polymer resin product hereof, and FIG. 2 is a flow diagram of the process.

According to the broader aspects of the present invention the glass substrate which is to be adhered to the polyvinyl resin is impregnated, as by coating, dipping, spraying or padding, with a primer comprising an amino-functional aliphatic silane in hydrolyzed form, preferably as an aqueous solution, after which the impregnated glass is dried. The thus primed glass substrate is then conventionally coated with a vinyl plastisol or organosol as by dipping, knife spreading or the like. Alternatively, the polyvinyl resin may be applied to the silane-treated substrate in the form of an unsupported sheet or film. In order to obtain an effective bond following application of the polyvinyl resin the coated glass is subjected momentarily to a temperature sufficiently high to fuse the resin. In the case of a plastisol momentary heating causes the resin powder to fuse and dissolve in the plasticizer in which it is suspended, thereby forming a uniform plasticized polyvinyl resin film which bonds to the primed glass fibers. The fusing temperature for unsupported vinyl polymer sheet and for organosols, plastisols and other types of liquid spreadable polyvinyl resins is from about 300 to 400° F. Fusing temperature will of course depend to some extent upon the composition of the polyvinyl material, and the amount and types of plasticizer, filler, etc., therein. Application of pressure during the fusing operation, particularly in the case of unsupported vinyl sheet material is also desirable and provides optimum bonding. Such pressure may be typically about 50 pounds per square inch and the time of heating at the aforesaid temperatures about 20 to 50 seconds.

The adhesive bonds thus produced between the polyvinyl resin and a fibrous glass substrate, for example a typical woven glass fiber fabric, is enhanced at least three times, and in most instances from about five to fifteen times as compared with the unprimed glass fabric.

The amino-functional aliphatic silanes employed in the present invention are in reality aminoalkyl trialkoxy silanes containing at least one secondary amino group, and up to about ten carbon atoms exclusive of those in the alkoxy groups attached to the silicon atom, in which latter groups there are one to three carbon atoms. Useful primary amino-functional silanes may be represented by the formula: $H_2N(CH_2)_xSi(OR)_3$ where $x$ is an integer from about 1 to 8 and R is an alkyl radical of 1 to 3 carbon atoms. A typical silane of this class is

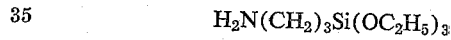

While simple primary amino-functional aliphatic silanes of the above type produce a substantially improved bond between the polyvinyl resin and the glass substrate, they do not function nearly so well as the aliphatic silanes containing one or more secondary amino groups or both primary and secondary amino groups. Appreciably stronger bonds are possible with these latter silanes when applied from considerably more dilute solutions than with the class of silanes containing only a primary amino-functional group, as will be apparent hereinafter.

The preferred amino-functional aliphatic silanes are those represented by the formula $$R_1HN(CH_2)_mNH(CH_2)_nSi(OR)_3$$

where $m$ and $n$ are integers from 1 to 4, R is an alkyl radical of 1 to 3 carbon atoms and $R_1$ is hydrogen, methyl or ethyl. Particularly useful silanes of this type of N(2-aminoethyl)-3-propylamino trimethoxy silane—

N(N-2 methylaminoethyl)-3-propylamino trimethoxy silane—$CH_3HN((CH_2)_2NH(CH_2)_3Si(OCH_3)_3$ and N-ethyl-3-propylamino trimethoxy silane—

For purposes of simplicity the present invention will be further described as it relates to the application of a polyvinyl resin film or layer to a fibrous glass substrate in the form of a woven fabric.

Referring now to the method of the present invention in further detail, the amino-functional aliphatic silane is prepared for application to the glass fabric by first dissolving it in water to enable the silane to hydrolyze to a form which is believed capable of chemically attaching to the glass. These silanes are readily soluble in water, but it is important that the priming solution be prepared by adding the amino-silane to water, as gelation may occur if this order is reversed. Upon dissolving in water hydroxyl groups are formed on the silicon atom, by virtue of which the silane is apparently able to attach to reactive sites on the surface of the glass, but also the silane begins to polymerize. Some degree of polymerization is apparently a factor contributing to the strength of the bond between the glass and the polyvinyl resin since the age of the aqueous silane solution directly affects the bond. It has been observed that following addition of the silane to tap water optimum bond strength is achieved with solutions of a given age. This is believed to be due to the presence of certain cations in the water which hasten polymerization. For example, in preparing 2% amino-silane solution with a particular tap water, optimum bond strengths are achieved when the solution is approximately four hours old, at temperatures of about 65–75° F. Accordingly, it is important to ascertain the proper aging time of the amino-functional silane solution for the particular water employed. Over-polymerization apparently reduces substantially the number of active groups on the silane molecule which are capable either of attaching to the glass or to the polyvinyl resin, although this phenomenon is not completely understood.

As noted, the hydrolyzed amino silane apparently chemically attaches to the glass fabric at reactive sites on the surface thereof, and yet only a very small quantity of the silane primer is required to tie to these reactive sites. For example, in the case of silanes containing one or more secondary amino groups or both primary and secondary amino groups an add-on of only about 0.1% based upon the dry weight of the fabric produces exceedingly strong adhesive bonds. With the primary amino-functional aliphatic silanes at least about 0.3% dry add-on is required to effect significant bond improvement. Accordingly, the hydrolyzed silanes are desirably applied to the fibrous glass substrate in very dilute aqueous solution, that is of the order of about 0.5% to about 6% solutions.

For example, with silanes containing one or more secondary or primary and secondary amino groups the solution concentrations for application to a typical light weight industrial glass fabric are preferably between about 0.5 and 2%. Solutions containing in excess of about 2% of these silanes fail to significantly improve the bond, and the silanes are thus desirably applied from about a 2% solution. With amino-functional silanes containing only primary amino groups, on the other hand, it has been found that solutions two to three times as strong are required.

The aqueous hydrolyzed silane primer is most conveniently applied to the fabric by padding, as with a two-roll padder employing a dip and nip technique. The quantity of primer solution imparted to the fabric will of course depend upon pad pressure and the holding power of the fabric which is a function of its weight and construction. A lower wet add-on will of course be experienced with a tight weave fabric than with a loose or open weave material or one constructed of very voluminous glass yarns. Thus it can be seen that for each fibrous glass substrate pad pressure and solution concentration will determine the quantity of silane actually applied to the fabric. It will be necessary to ascertain for each fabric the proper padding pressure and silane solution concentration to permit the silane to effectively tie up the reactive sites on the surface of the glass, thus producing the strongest adhesive bond between the glass fabric and the polyvinyl resin.

Certain of the silanes useful in the present invention are commercially available as solutions in ethanol, but no apparent advantage is realized through the use of materials in this form. It is preferred that the starting silane which is added to water to form the primer solution for application to the fabric be in concentrated form. The aqueous primer solution applied to the fabric may also contain an inert water-soluble solvent, although nothing is apparently to be gained by such technique.

It is of course within the scope of this invention to employ a priming solution containing two or more silanes, for example one of each type or to use a mixture of primary amino and primary amino-secondary amino silanes.

In order to achieve maximum bond strengths, it is important that the fibrous glass substrate be substantially completely clean, or "desized" in the case of fibrous glass yarn, roving, tape or fabric. The latter materials are desized by well-known chemical, thermal or chemical-thermal methods. Typical desizing processes are described in U.S. Patent Nos. 2,633,428, 2,845,364 and 2,970,934. Virtually no bond improvement is realized when a greige or undesized glass fabric is treated in accordance by the present process, as shown hereinafter.

The following typical example further illustrates the process of this invention:

A silane having the formula $$H_2N(CH_2)_2NH(CH_2)_3Si(OCH_3)_3$$

was dissolved in tap water at room temperature to produce a 1% solution which, as a result of previous determinations of optimum bond strength employing the particular tap water, was aged for a period of 4 hours at room temperature. This solution was then applied from a two-roll pad by simple dip and nip procedure to a thermally desized Hess, Goldsmith HG–119 woven lightweight industrial glass fabric (thickness, 0.004 inch; weight, 2.75 oz./sq. yd.; warp and fill construction 54 x 50—450's ½ glass yarns). Following padding the fabric was dried at a temperature of about 220° F. A spread coat of a vinyl plastisol consisting of 100 parts Geon 121 (a high molecular weight polyvinyl chloride), 50 parts dioctyl phthalate, 15 parts dioctyl sebacate, 15 parts filler, 5 parts titanium-dioxide and 3 parts heat and light stabilizer, was subsequently applied to one side only of the primed glass fabric, and the coated fabric was then placed in an oven and subjected to a temperature of 380° F. for 30 seconds in order to fuse the polyvinyl resin and produce a dry flexible film thereof.

In order to measure the adhesive bond between the polyvinyl chloride resin and the glass fabric, test sections were prepared by superimposing two pieces of the thus coated fabric with the coated sides facing down onto the two pieces of the same size coated fabric with the coated sides facing up. This assembly was then laminated in a press at 380° F. and 50 lbs./sq. in. pressure. After cooling and removal from the press, 2" wide strips were cut and tested for adhesion by peeling the two halves from each other at the rate of 2 inches per minute jaw separation. Average results were divided by two and are reported as pounds per inch of width. The product of the above example exhibited a glass fabric-polyvinyl resin adhesive bond of between 10 and 30 pounds, as compared with a bond strength of 2.1 pounds for the desized fabric which had not been primed with the silane. Bond strength is of course affected to some extent by the yarn denier and fabric weave, the cleanness of the fabric and the composition of the polyvinyl resin applied.

Further exhaustive tests were carried out with the typical amino-functional silane containing both primary and secondary amino groups,

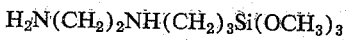

at various primer solution concentrations on greige and desized fabrics, with a typical primary amino-functional silane, $H_2N(CH_2)_3Si(OC_2H_5)_3$ and also with a silane containing only secondary amino groups. The silane primers were applied to the fabric by padding as set forth in the above example and the polyvinyl resin employed was the above-mentioned polyvinyl chloride plastisol. The glass substrate was HG–119 industrial light-weight fabric which, unless otherwise indicated, was thermally desized. The results of these tests are set forth in the following table.

TABLE I

| Primer and aqueous solution concentration: | Vinyl adhesion (lbs./in. of width) |
|---|---|
| None (greige fabric) | 2–3 |
| 1% $H_2N(CH_2)_2NH(CH_2)_3Si(OCH_3)_3$ (greige fabric) | 3.2 |
| None | 2–3 |
| $H_2N(CH_2)_2NH(CH_2)_3Si(OCH_3)_3$: | |
| 0.5% | 13.5–18.5 |
| 1% | 19–26 |
| 2% | 28 |
| 5% | 27 |
| 10% | 17–21 |
| 20% | 10 |
| 2% (prepared from 50% $C_2H_5OH$-silane solution) | 6 |
| 2% $CH_3HN(CH_2)_2NH(CH_2)_3Si(OCH_3)_3$ | 13 |
| $H_2N(CH_2)_3Si(OC_2H_5)_3$: | |
| 1.5% | 3.5–3.8 |
| 3% | 7–7.5 |
| 6% | 7.5–8 |

From these tests it can be seen that in order to obtain appreciable improvement in the strength of the adhesive bond between the glass fabric and the polyvinyl chloride the fabric must be substantially completely devoid of oils, starches and other sizing compositions. Furthermore, it is seen that with the typical silanes containing the secondary amino group very substantial improvements with HG–119 fabric are immediately apparent at only one-half percent concentration in the aqueous priming solution. A 2% solution of these silanes with this fabric appears to be optimum. No improvement results with concentrations of 5% and above. In fact at 10–20% of the primary-secondary amino silane the bond strength is adversely affected, indicating that appreciably more silane was applied to the fabric than was necessary to completely react with accepting groups on the surface thereof. It would thus appear that excess silane on the fabric detracts from vinyl bond strength.

It will also be noted from Table I that the typical primary amino-functional silane is not nearly so effective as silanes containing the secondary or both primary and secondary amino groups. Considerably more of the former material is required, and while bond strength is improved, the degree of improvement is comparatively substantially less.

A further series of tests was carried out with HG–119 desized glass fabric following generally the padding procedure of the above example, but substituting typical glass fabric finishing compositions which are employed in the art to effect good bonds between the glass and padding colors, organic adhesives, polyester, phenolic, epoxy and melamine-type resins. Among these materials are the complex chromic chlorides, a cationic water-soluble silicone and typical vinyl silane esters. The vinyl silanes would be thought to enhance the bond between glass and a polyvinyl chloride resin film.

From the following table reporting the results of these tests it can be seen that these representative finishes either do not enhance the glass-polyvinyl chloride resin bond or seriously detract from the normal bond between an unprimed glass fabric and a typical polyvinyl resin.

TABLE II

| Primer (2% aqueous solution unless otherwise indicated): | Vinyl adhesion (lbs./in. of width) |
|---|---|
| None | 2–3 |
| Volan (methacrylato chromic chloride) | <2 |
| Quilon (Werner chrome complex) | <2 |
| Cyano-chromic chloride | <2 |
| Glycinato-chromic chloride | <2 |
| Beta rescorcylato-chromic chloride | <2 |
| Dow Corning QZ–8–4003 (cationic water soluble silicone) | 3 |
| Dow Corning QZ–6238 (vinyl silane) | 2.9–3.2 |
| 3% Union Carbide A–172 (vinyl silane ester of monomethyl ether of ethylene glycol) | 1.5 |
| 10% A–172 | 3–3.3 |

Thus the particular silane primers of the present invention perform a unique function to very greatly enhance the normally insignificant adhesive bond between a fibrous glass substrate and a polyvinyl resin. However, this function is not yet fully clear since the affinity of the amino silanes for the polyvinyl resins is not understood. Apparently the silane chemically reacts with the glass and in some way serves as a bridge between the glass and the vinyl polymer.

The foregoing description is illustrative only of the broad principle of the present invention, and may be subject to obvious modifications and variations without departing from the basic novel features and spirit of this invention, the scope of which is limited only by the appended claims.

I claim:
1. A process for bonding a vinyl chloride polymer resin to a fibrous glass substrate, which comprises first impregnating a desized fibrous glass substrate with a hydrolyzed secondary aminoalkyl trialkoxy silane primer selected from the group consisting of (1) aminoalkyl silanes of the formula $R_1NH(CH_2)_mNH(CH_2)_nSi(OR)_3$, where $m$ and $n$ are integers from 2 to 3, R is an alkyl radical of 1 to 3 carbon atoms and $R_1$ is selected from the group consisting of hydrogen, methyl and ethyl, (2) a propylamino silane of the formula $R_1NH(CH_2)_3Si(OR)_3$, where R is an alkyl radical of 1 to 3 carbon atoms and $R_1$ is an alkyl radical of 1 to 2 carbon atoms, and (3) mixtures thereof, subsequently applying to the thus primed substrate a layer of a vinyl polymer selected from the group consisting of polyvinyl chloride and copolymers of vinyl chloride and vinyl acetate, and subsequently heating the thus treated substrate to between about 300 and 400° F.

2. A process as set forth in claim 1 wherein the hydrolyzed secondary aminoalkyl trialkoxy silane is applied to the fibrous glass substrate in aqueous solution, and including the additional steps of adding the silane to water and so aging the aqueous solution prior to impregnation of the glass substrate as to permit partial polymerization of the silane.

3. A process for bonding a vinyl chloride resin polymer to a desized fibrous glass substrate, which comprises first impregnating the substrate with an aqueous solution of partially polymerized hydrolyzed N(2-aminoethyl)-3-propylamino trimethoxy silane, subsequently applying a layer of a vinyl polymer selected from the group consisting of polyvinyl chloride and copolymers of vinyl chloride and vinyl acetate and then heating the thus treated substrate to between about 300 and 400° F.

4. A process for bonding a vinyl chloride resin polymer to a desized fibrous glass substrate, which comprises first impregnating the substrate with an aqueous solution of partially polymerized hydrolyzed N(N-2 methylaminoethyl)-3-propylamino trimethoxy silane, subsequently applying a layer of a vinyl polymer selected from the group consisting of polyvinyl chloride and copolymers of vinyl chloride and vinyl acetate and then heating the thus treated substrate to between about 300 and 400° F.

5. A process for bonding a vinyl chloride resin polymer to a desized fibrous glass substrate, which comprises first impregnating the substrate with an aqueous solution of partially polymerized hydrolyzed N-ethyl-3-propylamino trimethoxy silane, subsequently applying a layer of a vinyl polymer selected from the group consisting of polyvinyl chloride and copolymers of vinyl chloride and vinyl acetate and then heating the thus treated substrate to between about 300 and 400° F.

6. A glass product comprising a desized fibrous glass substrate and a layer of a vinyl chloride resin polymer selected from the group consisting of polyvinyl chloride and copolymers of vinyl chloride and vinyl acetate firmly adhered thereto through the intermediary of a partially polymerized hydrolyzed secondary aminoalkyl silane selected from the group consisting of (1) aminoalkyl silanes of the formula $R_1NH(CH_2)_mNH(CH_2)_nSi(OR)_3$, where $m$ and $n$ are integers from 2 to 3, R is an alkyl radical of 1 to 3 carbon atoms and $R_1$ is selected from the group consisting of hydrogen, methyl and ethyl, (2) a propyl amino silane of the formula $R_1NH(CH_2)_3Si(OR)_3$, where R is an alkyl radical of 1 to 3 carbon atoms and $R_1$ is an alkyl radical of 1 to 2 carbon atoms, and (3) mixtures thereof.

7. A glass product comprising a desized fibrous glass substrate and a layer of a vinyl chloride resin polymer selected from the group consisting of polyvinyl chloride and copolymers of vinyl chloride and vinyl acetate firmly adhered thereto through the intermediary of partially polymerized hydrolyzed N(2-aminoethyl)-3-propylamino trimethoxy silane.

8. A glass product comprising a desized fibrous glass substrate and a layer of a vinyl chloride resin polymer selected from the group consisting of polyvinyl chloride and copolymers of vinyl chloride and vinyl acetate firmly adhered thereto through the intermediary of partially polymerized hydrolyzed N(N-2 methylaminoethyl)-3-propylamino trimethoxy silane.

9. A glass product comprising a desized fibrous glass substrate and a layer of a vinyl chloride resin polymer selected from the group consisting of polyvinyl chloride and copolymers of vinyl chloride and vinyl acetate firmly adhered thereto through the intermediary of partially polymerized hydrolyzed N-ethyl-3-propylamino trimethoxy silane.

References Cited by the Examiner
UNITED STATES PATENTS

| | | | |
|---|---|---|---|
| 2,832,754 | 4/1958 | Jex | 260—46.5 |
| 2,930,809 | 3/1960 | Jex | 260—448.8 |
| 2,971,864 | 2/1961 | Speier | 117—124 |
| 3,014,607 | 12/1961 | Barnby et al. | 215—31 |
| 3,068,199 | 12/1962 | Sellers | 117—126 |
| 3,088,847 | 5/1963 | Pines | 260—448 |
| 3,168,389 | 2/1965 | Eilerman | 117—126 |

FOREIGN PATENTS
816,056    7/1959    Great Britain.

OTHER REFERENCES
Sidlovsky, J., Silicones in the Fiber Glass Industry. In The Glass Industry, September 1960, pp. 499–501 and 524.

ALEXANDER WYMAN, *Primary Examiner.*

JACOB STEINBERG, *Examiner.*

J. M. DULIN, W. J. VANBALEN, *Assistant Examiners.*